March 6, 1962 R. J. MELTZER 3,023,663
DIE WEAR MICROSCOPE
Filed Nov. 28, 1958 2 Sheets-Sheet 1

INVENTOR.
ROBERT J. MELTZER
BY
ATTORNEYS

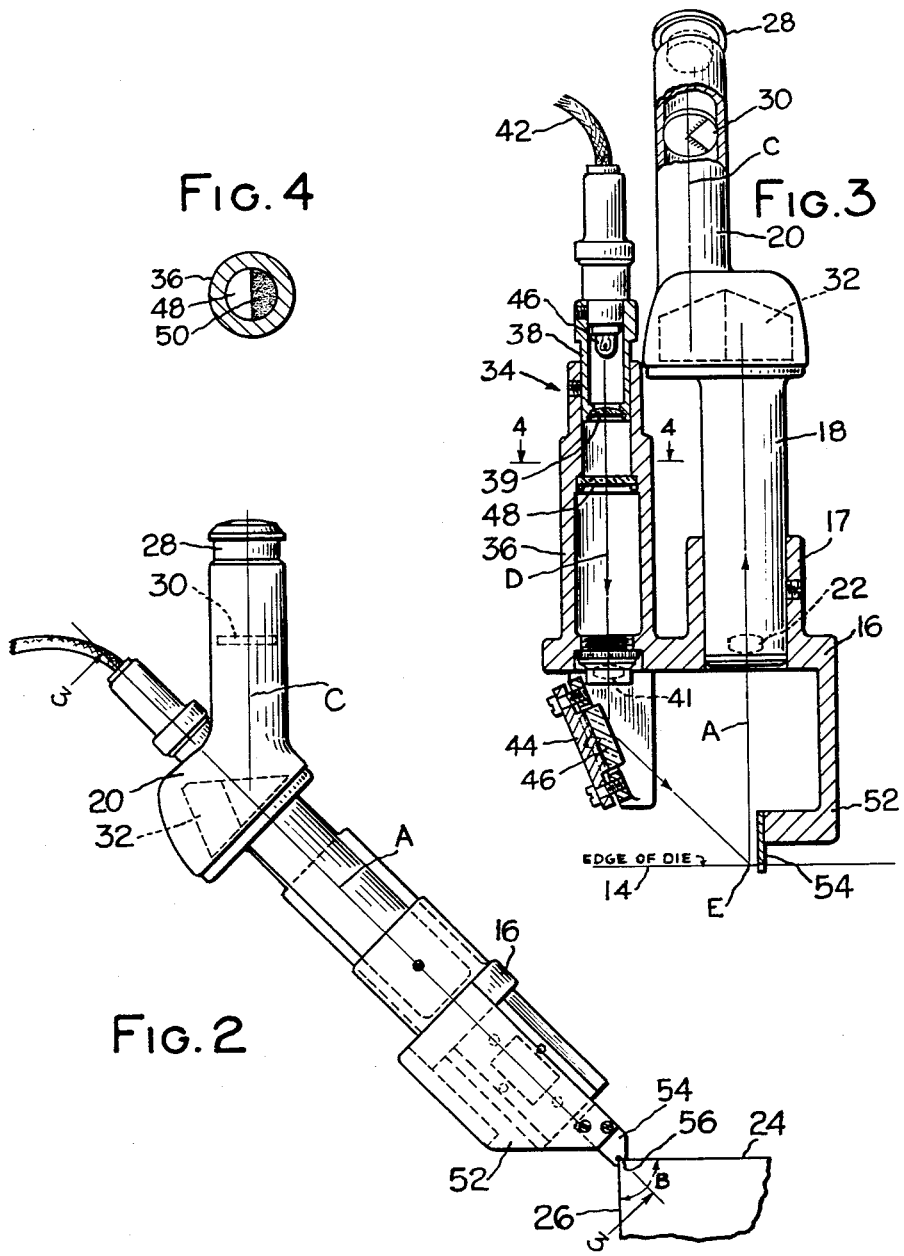

3,023,663
DIE WEAR MICROSCOPE
Robert J. Meltzer, Irondequoit, N.Y., assignor to Bausch & Lomb Incorporated, a corporation of New York
Filed Nov. 28, 1958, Ser. No. 776,864
1 Claim. (Cl. 88—14)

This invention relates to microscopes and, more particularly, to a microscope for viewing parts of a die while it is in working position in order to determine the amount of wear of the parts.

It is the principal object of the present invention to provide a microscope for the purpose of measuring die wear without removal of the die from its working position.

Another object of the invention is to provide means which will facilitate the repeated measurements of the working edges of a die with utmost accuracy during a grinding operation for reshaping the die.

Still another object of the invention is to provide means to accurately measure die wear in a minimum of time and without the usual requirement of performing meticulous alignment steps in arranging an optical viewing device with the die under study.

Other objects and advantages will become apparent from the following description taken in conjunction with the accompanying drawing wherein:

FIG. 2 is a side elevational view of the microscope shown as applied to a die;

FIG. 3 is a rear view of the microscope shown partly in section along the lines 3—3 of FIG. 2, and partly broken away;

FIG. 4 is a sectional view taken on lines 4—4 of FIG. 3; and

Figure 1:
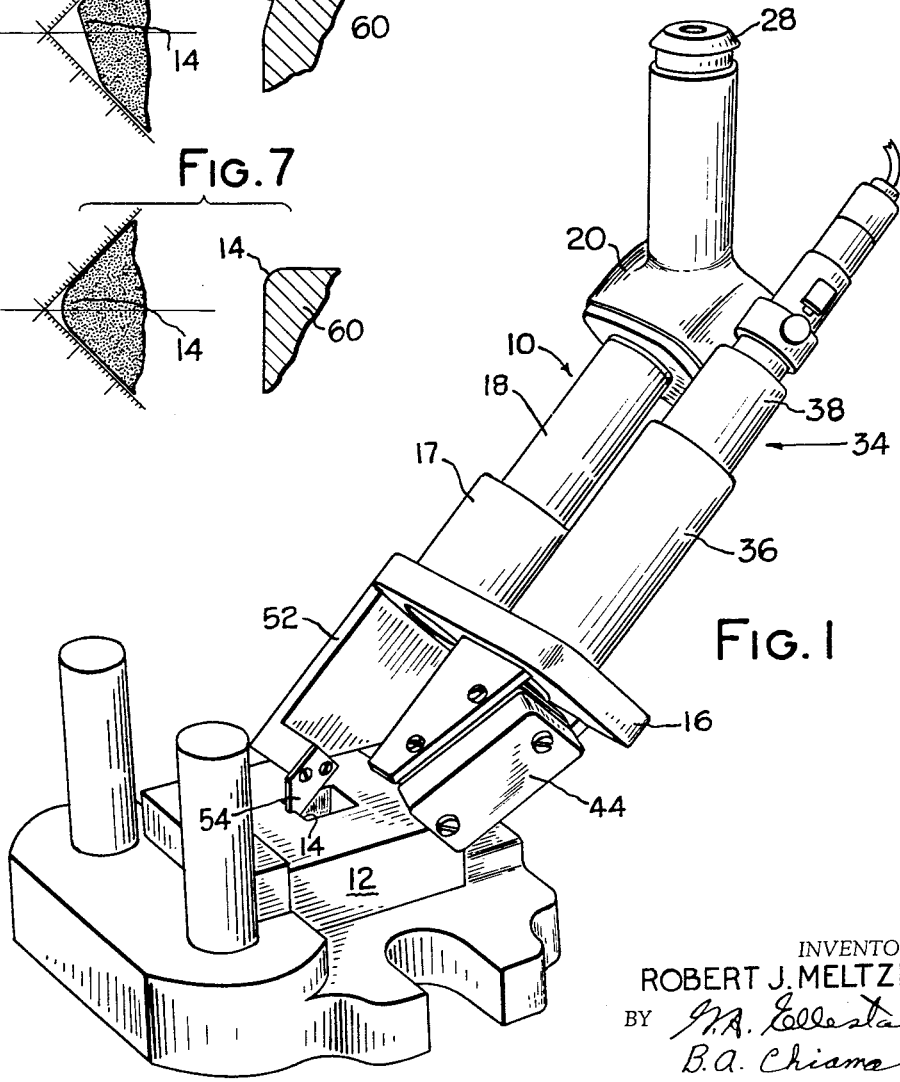
FIG. 1 is a perspective view of the microscope of the present invention as applied to a die under study.

Referring now to the drawing, the microscope 10 illustrated in FIG. 1 is shown as applied to a die 12 having an edge 14 to be studied for the determination of its metal forming ability or wear. The microscope 10 may be of the conventional type and is shown mounted on a base 16 formed with a nipple 17 for slidably receiving an upwardly inclined tubular member 18 which in turn serves to support an eyepiece casing 20. The tubular member 18 serves to support the objective lens 22 of the microscope and, as shown in FIG. 3, the optical axis A of the lens 22 is positioned at 45° angle with respect to the sides 24, 26 of the die 12. In actual practice, it is only necessary that the optical axis bisect the angle B between the sides of the die adjacent the edge 14 since the die may have working edges at angles other than 90°, which is illustrated in the drawing.

The eyepiece casing 20 has a suitable eyepiece 28 mounted therein and a glass plate 30, having indicia markings thereon, is arranged in the focal plane of the eyepiece and centered about optical axis C. The character and purpose of the indicia will be described hereinafter. Suitable reflecting surfaces in the form of prisms 32, mounted in the eyepiece casing 20, are employed in order to permit mounting of the eyepiece casing into a vertical position and to erect the image of the edge 14.

Also mounted on the base 16 is an illuminator 34 which comprises a tubular element 36 formed integral with the base 16, a lens holder 38 slidably mounted within the bore of the element 36, a condenser lens 39 mounted in the holder 38 and a lamp 40 mounted on the holder 38. A projector lens 41 is mounted at the lower end of the tubular element 36 and serves to project the image of the light source focused thereat onto the edge 14. Suitable conductors 42 are connected to a source of electrical current (not shown) for energizing the lamp. A mirror housing 44 is mounted on the under side of the base 16 and has seated therein a mirror 46 positioned so as to be in the path of the light rays from the lamp 40. The axis D of the illuminator 34 is parallel with the optical axis A and defines a plane therewith which bisects the angle between the sides 24, 26 of the edge 14. The mirror 46 is positioned at an angle with respect to the illuminator axis D whereby the light rays are directed to a point E on the optical axis A, as shown in FIG. 3. A circular glass plate 48, having one of its halves opaque and the other half transparent, is suitably mounted in the tubular element 36 and the boundary edge 50 between the two halves serves as a reticle to be projected upon the edge 14. As an alternative, the glass plate 48 may be eliminated and the condenser lens 39 may have its lower surface treated to render one half of the same opaque. The line 50, which separates the opaque and transparent portions of the glass plate, traverses the illuminator axis D and thereby extends through and is normal to the plane defined by the axes A and D. As shown in FIGS. 3 and 4, the darkened or opaque portion of the plate 48 is on the side of the axis D adjacent the optical axis of the objective lens 22. With the image of the opaque portion of the plate 48 being inverted by the projection lens 41 in the illuminator and being reflected by the mirror 46, the projected opaque portion upon the edge 14 will appear as a shadow oriented to the same position as it has on the plate 48. If the lens 41 is not provided in the illuminator, or an erection system is utilized, it will be apparent that the opaque portion will have to be positioned on the other side of the axis D from that shown.

Mounted depending from the base 16 is a bracket 52 which supports a work-engaging plate 54 formed with a notch 56 at one end thereof. The notch 56 is cut at an angle to correspond to the angle of the die edge 14 under study and for the present description this is illustrated as 90°. As shown in FIG. 3, the plate 54 is offset slightly from the optical axis A in order to avoid any interference of the field of view by the plate. The plate 54 serves as a spacer to ensure accurate spacing of the microscope 10 at its proper working distance from the die edge under study. An operator need merely position the microscope so that the sides of the notch 56 are in engagement with the sides of the die edge under study. The focal plane of the optical system for the microscope and the image of the opaque half portion of the plate 48 are chosen to coincide at the point E which is located in alignment with the apex of the notch 56. It will be apparent then that when the edge 14 of the die is straddled by the defining edges of the notch 56, the edge 14 will be in the focal plane of the microscope.

The indicia plate 30 has suitably inscribed thereon two rows of scale markings, as shown in FIGS. 3 and 5 to 8, and, for purposes of illustration, these rows are arranged at 90° to one another. The angle is chosen to be equal to the angle of the edge 14 of the die under study. The optical axis C of the eyepiece 20 projects through the apex of the indicia and the two rows of scale markings are positioned so that a line bisecting the angle therebetween lies in the plane defined by the axes A and D and is parallel with the edge 14.

The purpose of the illuminator 34 and the mirror 46 is to project a knife edge of light in a plane inclined 45° from the edge 14 of the die and thereby to define a section of the die adjacent to the edge 14 and on both sides thereof. With this arrangement, when the microscope is aligned with its optical axis perpendicular to the edge 14 and bisecting the edge angle, an image of the section profile defined by the knife edge of light is projected into the focal plane of the eyepiece 20 in coincidence with the indicia plate 30 for comparison therewith, and the projected image constitutes a true scale section of the workpiece without distortion.

In operation, the microscope may be hand held and positioned with the spacer plate 54 abutting against the die edge 14 to space the microscope at its working distance from the edge 14 thereby to facilitate focusing. The microscope is then pivoted about the point, or line of engagement between the spacer plate 54 and the die to bring the section image into alignment with the indicia carried on the indicia plate 30. For overall microscope magnifications up to about 40×, hand held operation has been found to be fully satisfactory. For greater magnifications a support (not shown) may be provided to steady the microscope.

Figure 5:
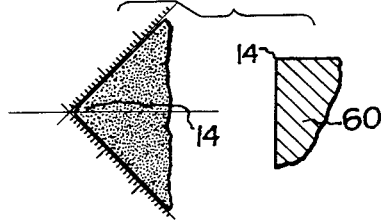
FIGS. 5, 6, 7 and 8 are fragmentary sectional views on an enlarged scale of a die edge shown with corresponding optical pictures of the edge when viewed through the microscope of FIG. 1.

In FIGS. 5–8, the relationships between the indicia and the die section defined by the knife edge of light, as applied to variously worn die edges are shown as they would be seen through the eyepiece of the microscope. In FIG. 5, a fragmentary portion 60 of the die 12 is shown in cross-section after grinding and before the die has been exposed to metal working. With the edge 14 in perfect condition, the two rows of indicia would be seen contiguous to the sides of the die edge. It will be noted that the apex of the angular indicia lies exactly upon the extreme tip of the edge 14 and that the bisecting line of the two rows of scale markings is in coincidence with the bisecting line of the angular shadow, which illustrates, in effect, the profile, or section of the edge 14.

Figure 8:
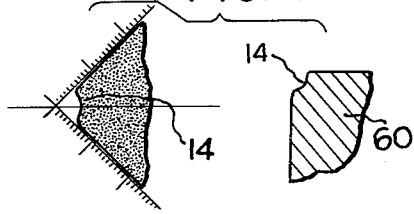
Figure 6:
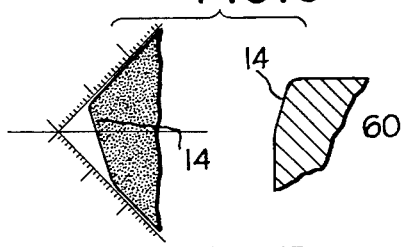
Figure 7:
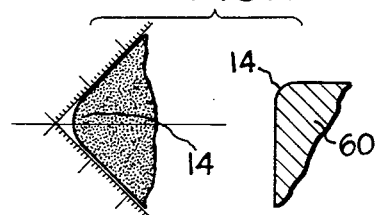

In FIG. 6, the edge 14 is shown worn along both sides but more along one side than the other. The profile of this edge is shown along the rows of scale markings and if these are accurately calibrated, an exact measurement of the die wear may be made. In FIG. 7, the edge 14 is worn in a quarter-round configuration and its profile, or section is illustrated along the scale markings. In this form of wear, the measurement from the apex of the indicia to the sides of the edge where the same are flat, is also a measure of the radius of the worn edge. In FIG. 8, another form of die wear is shown and, again, the amount of wear and also the radius of the curved edge may be easily observed.

From the foregoing, it will be appreciated that the microscope of the present invention may be quickly and easily applied to a die without the need for removing the same from its working position on a machine. The die may be repeatedly observed for wear and accurate measurements taken therefrom. The microscope may be hand held and adjusted for observation without the necessity of elaborate alignment devices for insuring accurate positioning.

I claim:

An optical measuring or testing device comprising a microscope for viewing the edge of a workpiece and forming a viewable image of the edge and adjacent surface portions of the workpiece, a fork tipped spacer device projecting forwardly from the objective end of said microscope for engaging the edge of the workpiece and spacing the microscope objective at its designed working distance from the edge, a light housing fixed adjacent to said microscope and extending generally parallel to the main barrel thereof, a light source within said housing, an optical condenser for collimating light emerging from said source, a knife edge within said housing on the opposite side of said condenser from said source and in optical alignment with said condenser, a mirror at the forward end of said housing for directing collimated light passing said knife edge toward the optical axis of said microscope at an angle of 45° relative thereto, said knife edge and mirror being arranged so that the shadow cast by said knife edge intersects the optical axis of said microscope at the designed working distance in front of the microscope objective, and a reticle in an internal image plane of said microscope for comparing the shape of the knife edge shadow as cast on the workpiece with indicia on the reticle.

References Cited in the file of this patent

UNITED STATES PATENTS

| 2,208,882 | Graff et al. | July 23, 1940 |
| 2,256,102 | Reason | Sept. 16, 1941 |

FOREIGN PATENTS

| 395,649 | Great Britain | July 20, 1933 |
| 771,553 | Great Britain | Apr. 3, 1957 |
| 199,203 | Austria | Aug. 25, 1958 |

OTHER REFERENCES

"A Topographic Microscope" (Tolansky), Scientific American, vol. 191, No. 2, pages 54–59, August 1954.

"Topographic Microscope" (Saur), The Review of Scientific Instruments, vol. 29, No. 11, pages 1023–1026, November 1958. (Received Patent Office Scientific Library on Oct. 31, 1958.)